(12) United States Patent
Carpenter

(10) Patent No.: US 8,515,663 B2
(45) Date of Patent: Aug. 20, 2013

(54) SYSTEM AND METHOD FOR DELIVERY ROUTE ASSISTANCE

(75) Inventor: Michael D. Carpenter, Arlington, TX (US)

(73) Assignee: Siemens Industry, Inc., Alpharetta, GA (US)

(*) Notice: Subject to any disclaimer, the term of this patent is extended or adjusted under 35 U.S.C. 154(b) by 317 days.

(21) Appl. No.: 12/845,996

(22) Filed: Jul. 29, 2010

(65) Prior Publication Data

US 2011/0029233 A1 Feb. 3, 2011

Related U.S. Application Data

(60) Provisional application No. 61/229,405, filed on Jul. 29, 2009.

(51) Int. Cl.
*G01C 21/00* (2006.01)
*G06F 7/00* (2006.01)
*G06K 9/00* (2006.01)
*H04N 5/228* (2006.01)
*H04B 1/38* (2006.01)

(52) U.S. Cl.
USPC ...... 701/410; 700/226; 382/189; 348/208.14; 455/566

(58) Field of Classification Search
USPC ........ 701/410–424, 428, 431, 519; 705/7.13, 705/7.16, 7.19, 7.22, 7.23, 7.27, 7.36, 13, 705/12, 1, 24, 28, 6, 7; 348/14.01, 14.03–14.09; 455/556.1, 556.2; 382/102, 101; 700/226
See application file for complete search history.

(56) References Cited

U.S. PATENT DOCUMENTS

| | | | |
|---|---|---|---|
| 2002/0049622 A1 | 4/2002 | Lettich | |
| 2005/0021346 A1* | 1/2005 | Nadan et al. | 705/1 |
| 2008/0195428 A1* | 8/2008 | O'Sullivan | 705/6 |
| 2010/0100233 A1* | 4/2010 | Lu | 700/226 |

OTHER PUBLICATIONS

PCT International Search Report dated Apr. 13, 2011 corresponding to PCT Application No. PCT/US10/43616 filed Jul. 29, 2010 (11 pages).

* cited by examiner

*Primary Examiner* — Muhammad Shafi

(57) ABSTRACT

A system, method, and apparatus for delivery route assistance. A method includes receiving a delivery location and an image associated with each of a plurality of items and determining a planned delivery route for delivery of the items. The method also includes displaying execution instructions for the planned delivery route to a delivery operator and, at each delivery location, displaying to the delivery operator a count of items for delivery at the delivery location and the image associated with each such item. The method further includes recording information associated with an actual delivery route and reconfiguring the planned delivery route when the actual delivery route is different from the planned delivery route. The method also includes displaying a comparison between information associated with the planned delivery route and the recorded information associated with the actual delivery route.

20 Claims, 4 Drawing Sheets

SYSTEM AND METHOD FOR DELIVERY ROUTE ASSISTANCE

CROSS-REFERENCE TO OTHER APPLICATION

This application claims the benefit of the filing date of U.S. Provisional Patent Application 61/229,405, filed Jul. 29, 2009, which is hereby incorporated by reference.

TECHNICAL FIELD

The present disclosure is directed, in general, to route assistance in physical delivery of items.

BACKGROUND OF THE DISCLOSURE

Efficient planning and execution of the physical delivery of items is desirable.

SUMMARY OF THE DISCLOSURE

Various disclosed embodiments include a system and method for delivery route assistance. A method includes receiving a delivery location and an image associated with each of a plurality of items and determining a planned delivery route for delivery of the items. The method also includes displaying execution instructions for the planned delivery route to a delivery operator and, at each delivery location, displaying to the delivery operator a count of items for delivery at the delivery location and the image associated with each such item. The method further includes recording information associated with an actual delivery route and reconfiguring the planned delivery route when the actual delivery route is different from the planned delivery route. The method also includes displaying a comparison between information associated with the planned delivery route and the recorded information associated with the actual delivery route.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

In a delivery service, the cost of delivery may be significantly affected by the cost of the labor of delivery personnel and the cost of fuel. In turn, these factors may be affected by the efficiency with which the route is planned and the execution of the planned route by a delivery operator. Dramatic differences between the efficiency of different individuals in the performance of similar or even identical routes may stem from factors such as variability in the work habits from operator to operator and, for an individual operator, from one day to the next. Typically, the standard against which performance of a delivery route is compared is the same delivery operator working the same route on a different day. Other standard processes and methods, which would, on their face, offer the potential to standardize the efficiency and productivity of a delivery process, have typically not been effective to that end.

In delivery services with non-static routes, a delivery operator is presented with a load of items to be delivered, and the operator may be required to make decisions along the course of the route regarding the sequence of delivery stops, a route between delivery stops, and the identification and delivery of items at delivery stops. Mistakes in making these decisions are costly, not only in terms of labor cost and fuel, but also in terms of delivery quality, safety, and environmental impact. Typically, at the end of a delivery route, the only real witness to the quality of its execution is the delivery operator, and few insights are available to the managers of the delivery service.

Various measures and systems have been developed with the intention of enabling the delivery operator to make fewer or better decisions during the delivery process. Such systems, particularly those intended to measure delivery performance, typically require specific attention from the delivery operator, such that the use of the system becomes onerous, and may have the effect of reducing the productivity of the delivery operator.

Figure 1:
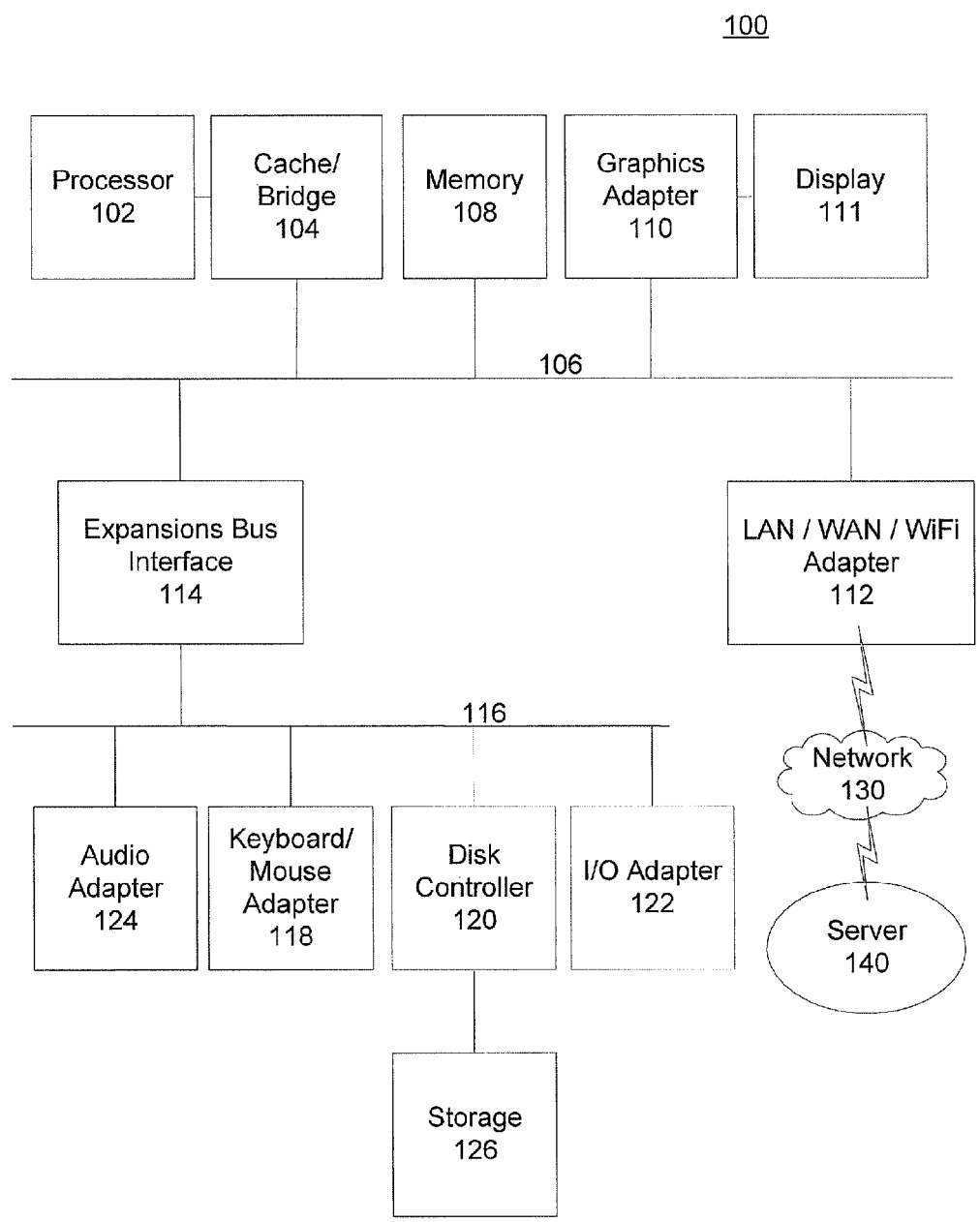
FIG. 1 depicts a block diagram of a data processing system in which an embodiment can be implemented.

FIG. 1 depicts a block diagram of a data processing system 100 in which an embodiment can be implemented, for example as a delivery route assist system and/or as a portable device configured to perform processes as described herein. The data processing system 100 includes a processor 102 connected to a level two cache/bridge 104, which is connected in turn to a local system bus 106. The local system bus 106 may be, for example, a peripheral component interconnect (PCI) architecture bus. Also connected to the local system bus 106 in the depicted example are a main memory 108 and a graphics adapter 110. The graphics adapter 110 may be connected to a display 111.

Other peripherals, such as a local area network (LAN)/Wide Area Network/Wireless (e.g. WiFi) adapter 112, may also be connected to the local system bus 106. An expansion bus interface 114 connects the local system bus 106 to an input/output (I/O) bus 116. The I/O bus 116 is connected to a keyboard/mouse adapter 118, a disk controller 120, and an I/O adapter 122. The disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to the I/O bus 116 in the example shown is an audio adapter 124, to which speakers (not shown) may be connected for playing sounds. The keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. In some embodiments, multiple data processing systems may be connected and configured to cooperatively perform the processing described herein. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

The LAN/WAN/Wireless adapter 112 can be connected to a network 130 (not a part of data processing system 100), which can be any public or private data processing system network or combination of networks, as known to those of skill in the art, including the Internet. The data processing system 100 can communicate over the network 130 with a server system 140, which is also not part of the data processing system 100, but can be implemented, for example, as a separate data processing system 100.

Figure 2:
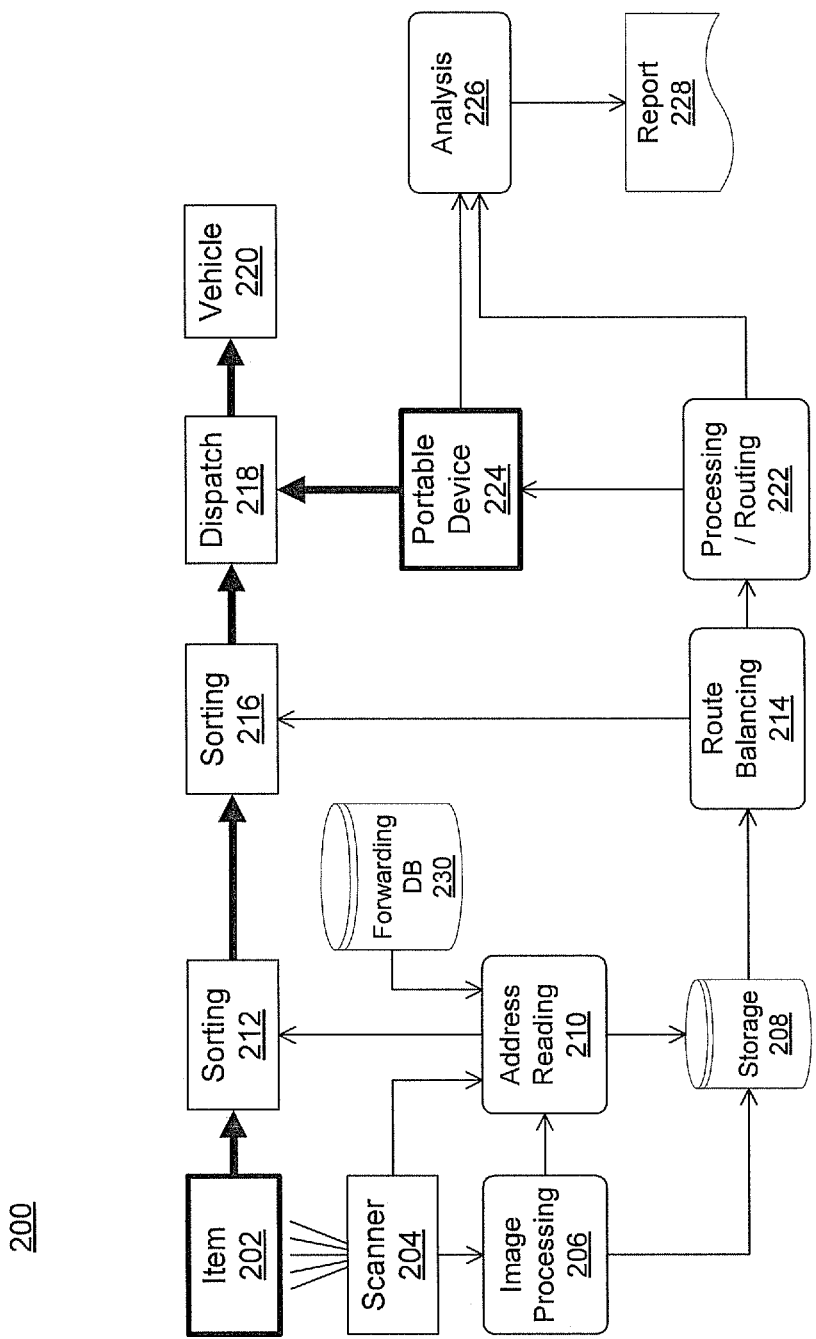
FIG. 2 depicts a block diagram illustrating a delivery route assist system in accordance with an embodiment.

FIG. 2 depicts a block diagram illustrating a delivery route assist (DRA) system 200 in accordance with an embodiment. An item 202 is one of a plurality of items received and processed by the DRA system 200. The item 200 may be a letter, a flat (magazine-sized item), a parcel (box), or other item for delivery. As the item 202 is received into the DRA system 200, it is scanned by a scanner 204. The scanner 204 captures a visual image of the item 202 and may also scan the item 202 with a magnetic, radio frequency, or other sensor. The visual image of the item 202 formed by the scanner 204 is communicated to an image processing system 206, which forms a reduced-resolution thumbnail version of the image and stores in a storage device 208 information associating the thumbnail image with the item 202.

The visual image of the item 202 formed by the scanner 204 is also communicated to an address reading system 210 by the image processing system 206. The scanner 204 may communicate information obtained from magnetic, radio frequency, or other sensors directly to the address reading system 210 or via the image processing system 206. From the visual image or other sensor information, the address reading system 210 extracts information encoded on the item 202 relating to a location to which the item 202 is to be delivered. From the extracted information, the address reading service 210 determines a delivery location for the item 202. The address reading service 210 stores in the storage device 208 information associating the delivery location with the item 202.

The address reading system 210 may access a forwarding database 230 for information identifying an alternative delivery location that has been associated with the delivery location encoded on the item 202. The information in the forwarding database 230 may be received from a source external to the DRA system 200. If such an alternative delivery location is found, the address reading system 210 stores in the storage device 208 information associating the alternative delivery location with the item 202, rather than the delivery location encoded on the item 202. In this way, the item 202 may be forwarded to an alternative delivery location without the use of printed forwarding labels, which may add cost, processing steps, and processing time to handling of the item 202.

The address reading service 210 also communicates the delivery location to a sorting device 212. The sorting device 212 physically receives the item 202 after scanning by the scanner 204 and sorts the item 202 according to the delivery information received from the address reading system 210. The sorting device 212 sorts item 202 and other items by state or city or other delivery location characteristic for physical transport to sorting device 216. Such physical transport may be by conveyor belt, hand cart, truck, airplane or any other suitable physical transportation. The sorting device 216 sorts the items by route, placing all items allocated to each route in a storage location associated with the route.

The sorting device 216 is controlled by a route balancing system 214, which receives information from the storage device 208 relating to the delivery locations and images associated with items transported to the sorting device 216. The route balancing system 214 allocates each item to a route in order to permit delivery of the items within a specified maximum delivery time. The route balancing system 214 may consider factors such as proximity of delivery locations, efficiency of delivery operators, special item handling requirements and other factors in allocating the items to routes.

Once items have been allocated to routes, the route balancing system 214 communicates to a processing/routing system 222 the delivery locations and images associated with the items allocated to each route. The processing/routing system 222 then determines, for each route, a sequence of delivery locations and transit paths to follow in reaching those delivery locations.

The route balancing system 214 and the processing/routing system 222 may be operated in an iterative manner, with an item being assigned initially to a first route in the route balancing system 214 before being reassigned to another route in a final allocation, based upon a determination made by the processing/routing system 222. All such iterations are completed before the route balancing system 214 begins controlling the sorting device 216 to place items allocated to each route in the storage location associated with the route.

The processing/routing system 222 formulates a plurality of routing hypotheses (or alternative combinations of sequence and paths) for each route and evaluates the hypotheses based upon one or more of a plurality of route evaluation criteria. For each routing hypothesis, the processing/routing system 222 may determine a measure of safety for the hypothesis, based upon characteristics of the transit paths between delivery locations such as a number of left turns, types of traffic situations, types of road traveled (highway, side road, etc.), and other characteristics affecting safety. The processing/routing system 222 may also determine an expected fuel cost for the transit path of a routing hypothesis. The processing/routing system 222 may determine a measure of labor cost, such as whether one routing hypothesis will deliver more or fewer items than another hypothesis, resulting in a requirement for fewer or more delivery operators, respectively, or other characteristics of labor cost.

The processing/routing system 222 may determine a measure of service quality for each routing hypothesis, based on factors such as expected pickup/delivery events that do not meet specific criteria (such as, before 10:00 AM) and other characteristics affecting service quality. For each routing hypothesis, the processing/routing system 222 may determine a measure of one or more effects of the hypothesis on the delivery operator, such as total number and combined weight of the items to be delivered, and other characteristics affecting the delivery operator.

Where the processing/routing system 222 determines a plurality of route evaluation criteria for a hypothesis, it may form an aggregate route evaluation measure for the hypothesis. In some embodiments, the processing/routing system 222 scales each route evaluation criterion by a specified weight in forming the aggregate route evaluation measure for the hypothesis. Some route evaluation criteria characteristics may vary daily, weekly, or over some other time frame. When the processing/routing system 222 assesses route evaluation criteria for candidate routing hypotheses for a route, it employs current, updated values for any such characteristics used in the assessment.

Additionally, the number and selection of criteria considered in selecting a route, as well as the weight to apply to the criteria, may change as priorities of the delivery organization change or as improvements are made to the route balancing and processing routing systems. When the processing/routing system 222 assesses route evaluation criteria for candidate routing hypotheses for a route, it also employs current, updated number, selection and weights of criteria for the assessment.

Once the processing/routing system 222 has determined route evaluation criteria or aggregate route evaluation measures for a plurality of candidate hypotheses, it compares the criteria or measures and selects a preferred routing hypothesis based upon the comparison. Because of variations in numbers of items to be delivered, fuel cost, labor cost, traffic conditions, organizational priorities, and other factors, the delivery locations and routing hypothesis for a route may remain the same or may change from day to day or over longer time periods.

Once the route balancing system 214 and the processing/routing system 222 have reached a final allocation of items and selection of routing hypothesis, respectively, for each route, the processing/routing system 222 communicates to a portable device 224 the routing hypothesis that has been selected for a route and images for the items allocated to the route. The processing/routing system 222 may communicate manifest data, the routing hypothesis and associated images for each of a plurality of routes to each of a corresponding plurality of portable devices 224. The portable device 224 is configured to display to a delivery operator the selected sequence of delivery locations and transit paths between delivery locations of the selected routing hypothesis and, at each delivery location, a number/count and images of the items to be delivered at that delivery location.

In a dispatch process 218, the items allocated to a route and the portable device 224 that has been prepared for the delivery operator of the route are physically transferred to a vehicle 220. Where the DRA system 200 coordinates delivery via a plurality of routes, the dispatch process 218 transfers a plurality of combinations of items and portable devices 224 to a corresponding plurality of vehicles 220.

When the delivery operator commences the route, the portable device 224 may begin providing route execution instructions to the delivery operator as spoken instructions, annotated maps, and other appropriate forms. At each stop along the route, the portable device 224 displays to the delivery operator the number of items for delivery at that location and the images of those items, to assist the operator in identifying the items.

While a delivery operator is delivering the items allocated to a route, the portable device 224 records information relating to the actual route taken to deliver the items. The portable device 224 may record information such as an actual order of stops made, a transit time between each stop, a delivery time at each stop, fuel consumed during the route, traffic conditions encountered during the route, and other information suitable to allow analysis of the delivery operator's performance of the expected route.

If the delivery operator deviates from the planned order and/or transit paths of the routing hypothesis selected by the processing/routing system 222, the portable device 224 reconfigures the remaining delivery locations of the route based on the same or similar route evaluation criteria used by the processing/routing system 222 in originally selecting the planned route. The portable device 224 may perform this reconfiguration locally or may communicate wirelessly with the planning/routing system 222 or other system to perform the reconfiguration. In performing the reconfiguration, characteristics such as traffic conditions that may have changed since the planned route was originally formulated may be updated and current values used in the reconfiguration.

When the route is complete and the vehicle 220 returns, the recorded information relating to the actual route taken is communicated to an analysis system 226. Also communicated to the analysis system 226 (from the processing/routing system 222) is information related to the routing hypothesis selected for the route. The analysis system 226 compares corresponding information relating to the actual route and the planned route and prepares a report 228 that presents one or more measures of the delivery operator's performance of the planned route. While FIG. 2 depicts analysis and report preparation by systems separate from the portable device 224, in other embodiments, analysis and report preparation may be performed by the portable device 224. Delivery management may then review the report with the delivery operator to determine reasons for any deviations from the planned route, compare the report to previous reports for the same operator or the same route, and use the report and the comparison to evaluate either or both of the DRA system 200 and the delivery operator.

FIG. 2 illustrates one functional division between components in the DRA system 200. However, various components in FIG. 2 could be combined or further subdivided, such as by combining the processing/routing system 222, the analysis system 226, and the portable device 224 into a single physical unit. Furthermore, various processing components in the DRA system 200 may be collocated with the physical elements of the system (such as the scanner 204, the sorters 212 and 216, etc.) or may be provided by a server located at a geographically separate location. Various components could also be omitted from the system 200 if their functionality is not desired or required in a particular implementation. In addition, FIG. 2 illustrates one operational environment in which delivery route assistance can be used. The DRA system 200 or its associated functionality could be used in any other suitable device or system.

Figure 3:
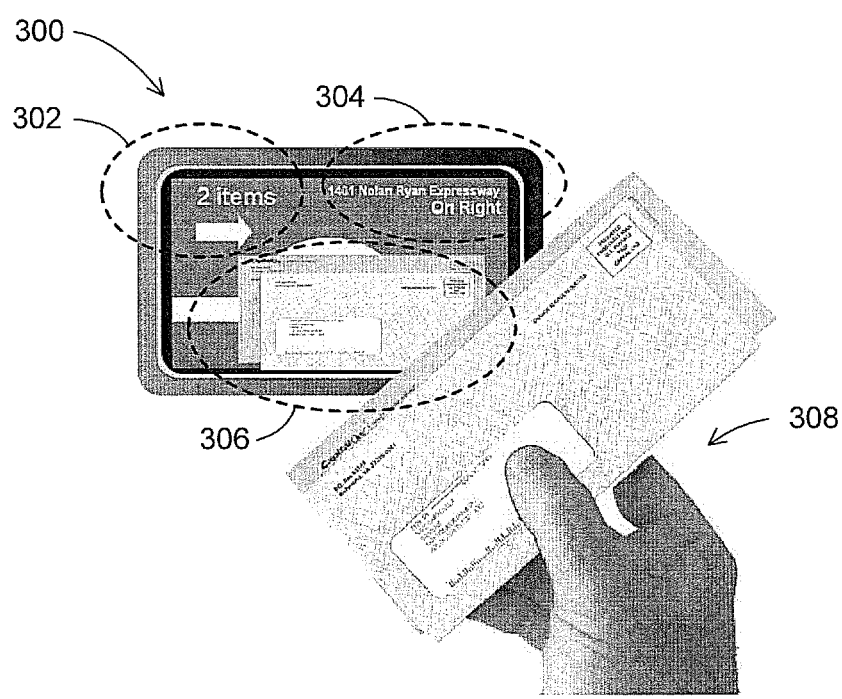
FIG. 3 depicts a portable device display in accordance with various embodiments.

FIG. 3 depicts a display 300 of the portable device 224 in accordance with an embodiment. The information shown in the display 300 is provided to a delivery operator as the operator approaches and reaches a delivery location. In a first portion 302 of the display 300, the portable device 224 displays an indication of a number of items to be delivered at the delivery location. In a second portion 304 of the display 300, the portable device 224 displays a street address and other appropriate information to assist the delivery operator in locating the delivery location. In a third portion 306 of the display 300, the portable device 224 displays one or more images of the items to be delivered at the delivery location. While images of letters are shown in FIG. 3, at other delivery locations images of flats and/or parcels may be displayed, as appropriate.

Figure 4:
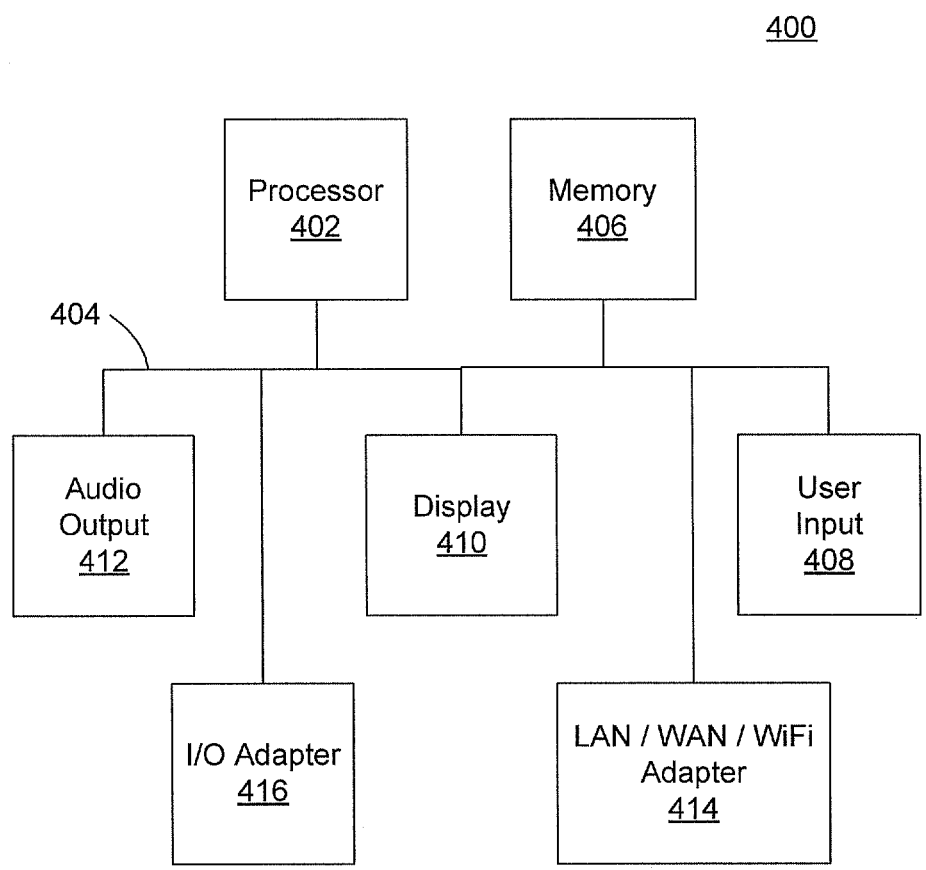
FIG. 4 depicts a block diagram of a portable device in which an embodiment can be implemented.

FIG. 4 depicts a block diagram of a portable device 400 in which an embodiment can be implemented. The portable device 400 includes a processor 402 connected to a local system bus 404. Also connected to the local system bus 404 in the depicted example is a memory 406. The memory 406 stores data for use by the processor 402 and other elements of the portable device 400. Such data includes the sequence of delivery locations and transit paths selected for the delivery route by the processing/routing system 222 and the images of the items allocated to the route by the route balancing system 214. The memory 406 also stores instructions for execution by the processor 402. The memory 406 includes one or more of read only memory (ROM), random access memory (RAM), a hard disk drive, a compact disc (CD), a digital video disc (DVD), and any other type of memory capable of being accessed by a computer.

Also coupled to the local system bus 404 is a user input 408. The user input 408 may include a keyboard, touch screen, mouse, trackball, or other device that enables a delivery operator to input information to the portable device 400. A display 410 is coupled to the local system bus 404 and may be used by the processor 402 or other element of the portable device 400 to display information graphically to the delivery operator. An audio output 412 may also be coupled to the local system bus 404 and may be used by the processor 402 or other element of the portable device 400 to communicate information to the delivery operator using sound.

An input/output (I/O) adapter 416 may be coupled to the local system bus 404. Similarly, a local area network (LAN)/Wide Area Network/Wireless (e.g. WiFi) adapter 414 may be coupled to the local system bus 404. One or both of the I/O adapter 416 and the Lan/Wan/WiFi adapter 414 may be used by the processor 402 and/or other element of the portable device 400 to communicate via wired or wireless interface with external devices. Such external devices may include an odometer of the delivery vehicle 220, a global positioning system (GPS) receiver, the processing/routing system 222, a traffic condition reporting system, and other devices that may provide information to the portable device in performance of its functions.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for delivery route assistance, the method comprising:
   receiving in a hardware data processing system a delivery location and an image associated with each of a plurality of items, each of the items being a letter, flat, or parcel;
   determining in the data processing system a planned delivery route for delivery of the plurality of items;
   displaying execution instructions for the planned delivery route to a delivery operator;

at each delivery location, displaying by the data processing system and to the delivery operator a count of items for delivery at the delivery location and the image associated with each such item to assist the delivery operator in identifying the items for delivery at the delivery location;

recording information associated with an actual delivery route by the data processing system;

reconfiguring the planned delivery route, by the data processing system, when the actual delivery route is different from the planned delivery route; and displaying, by the data processing system, a comparison between information associated with the planned delivery route and the recorded information associated with the actual delivery route.

2. The method of claim 1, wherein:
determining a planned delivery route comprises:
 determining route evaluation criteria for each of a plurality of possible routes, where the route evaluation criteria include a measure of at least one of safety, service quality, fuel cost, labor cost, and an effect of the route on a delivery operator implementing the route;
 comparing the route evaluation criteria for each of the plurality of possible routes; and
 selecting a route from the plurality of possible routes based upon a result of the comparison; and
reconfiguring the planned delivery route is based on the route evaluation criteria.

3. The method of claim 1, wherein determining a planned delivery route comprises:
determining a first planned delivery route for a first subset of the plurality of items; and
determining a second planned delivery route for a second subset of the plurality of items,
wherein determining a first planned delivery route comprises transferring an item from the first subset to the second subset.

4. The method of claim 1, wherein the delivery location associated with at least one item is different than a delivery location encoded on the item.

5. The method of claim 1, wherein displaying a comparison between information associated with the planned delivery route and information associated with the actual delivery route comprises comparing at least one of route taken between delivery locations, order of stops, time between delivery locations, time at a delivery location, expected and actual fuel consumption.

6. The method of claim 1, wherein receiving a delivery location and an image associated with each of a plurality of items comprises:
capturing an image of an item; and
processing the image to determine a delivery location for the item.

7. The method of claim 6, wherein processing the image to determine a delivery location for the item comprises:
receiving information from a source external to the data processing system, the information associating a first delivery location with a second delivery location; and
when the image of the item indicates the first delivery location, associating the second delivery location with the item.

8. A system for delivery route assistance, the system comprising:
a data processing system having at least one processor, configured to:
 receive a delivery location and an image associated with each of a plurality of items, each of the items being a letter, flat, or parcel; and
 determine a planned delivery route for delivery of the plurality of items; and
a portable device having at least one processor, configured to:
 receive the planned delivery route from the data processing system;
 receive the images of the items;
 display execution instructions for the planned delivery route;
 at each delivery location, display a count of items for delivery at the delivery location and the image associated with each such item to assist the delivery operator in identifying the items for delivery at the delivery location;
 record information associated with an actual delivery route;
 reconfigure the planned delivery route when the actual delivery route is different from the planned delivery route,
wherein one of the data processing system and the portable device is further configured to display a comparison between information associated with the planned delivery route and the recorded information associated with the actual delivery route.

9. The system of claim 8, wherein
the data processing system is further configured to:
 determine route evaluation criteria for each of a plurality of possible routes, where the route evaluation criteria include a measure of at least one of safety, service quality, fuel cost, labor cost, and an effect of the route on a delivery operator implementing the route;
 compare the route evaluation criteria for each of the plurality of possible routes; and
 select a route from the plurality of possible routes based upon a result of the comparison; and
the portable device is further configured to reconfigure the planned delivery route is based on the route evaluation criteria.

10. The system of claim 8, wherein the data processing system is further configured to:
determine a first planned delivery route for a first subset of the plurality of items; and
determine a second planned delivery route for a second subset of the plurality of items,
wherein determine a first planned delivery route comprises transferring an item from the first subset to the second subset.

11. The system of claim 8, wherein the data processing system is further configured to associate with at least one item a delivery location that is different than a delivery location encoded on the item.

12. The system of claim 8, wherein the one of the data processing system and the portable device is further configured to display the comparison between information associated with the planned delivery route and the recorded information associated with the actual delivery route by comparing at least one of route taken between delivery locations, order of stops, time between delivery locations, time at a delivery location, expected and actual fuel consumption.

13. The system of claim 8, wherein the data processing system is further configured to:
capture an image of an item; and
process the image to determine a delivery location for the item.

14. The system of claim 13, wherein the data processing system is further configured to:
  receive information from an external source, the information associating a first delivery location with a second delivery location; and
  when the image of the item indicates the first delivery location, associate the second delivery location with the item.

15. An apparatus, configured to:
  determine a planned delivery route;
  receive an image associated with each of a plurality of items to be delivered on the planned delivery route, each of the items being a letter, flat, or parcel;
  display execution instructions for the planned delivery route;
  at each delivery location, display a count of items for delivery at the delivery location and the image associated with each such item to assist the delivery operator in identifying the items for delivery at the delivery location;
  record information associated with an actual delivery route; and
  reconfigure the planned delivery route when the actual delivery route is different from the planned delivery route.

16. The apparatus of claim 15, further configured to determine the planned delivery route by receiving the planned delivery route from an external source.

17. The apparatus of claim 15, further configured to determine a planned delivery route by:
  determining route evaluation criteria for each of a plurality of possible reconfigured routes, where the route evaluation criteria include a measure of at least one of safety, service quality, fuel cost, labor cost, and an effect of the route on a delivery operator implementing the route;
  comparing the route evaluation criteria for each of the plurality of possible reconfigured routes; and
  selecting a route from the plurality of possible reconfigured routes based upon a result of the comparison.

18. The apparatus of claim 17, further configured to reconfigure the planned delivery route based on the route evaluation criteria.

19. The apparatus of claim 15, further configured to display a comparison between information associated with the planned delivery route and the recorded information associated with the actual delivery route.

20. The apparatus of claim 19, further configured to display the comparison between information associated with the planned delivery route and the recorded information associated with the actual delivery route by comparing at least one of route taken between delivery locations, order of stops, time between delivery locations, time at a delivery location, expected and actual fuel consumption.

* * * * *